Oct. 10, 1939.  E. LEWIN  2,175,354
ELECTROSTATIC RELAY
Filed Oct. 5, 1937  2 Sheets-Sheet 1
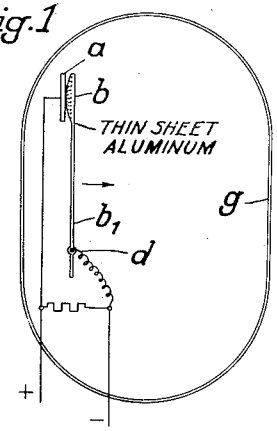
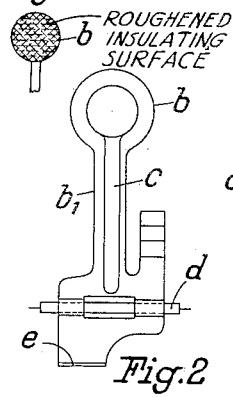
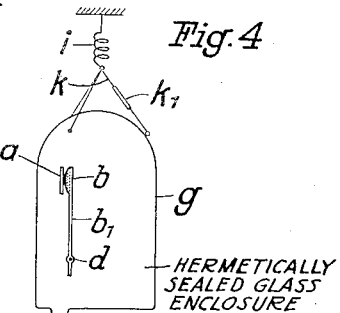
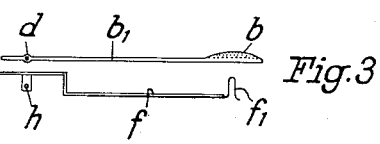
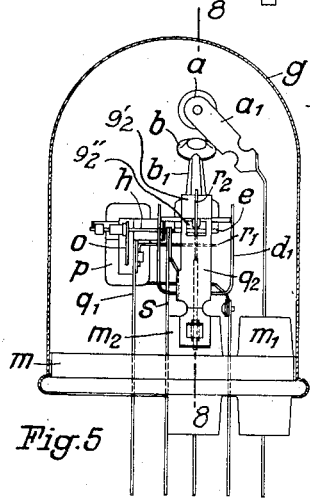
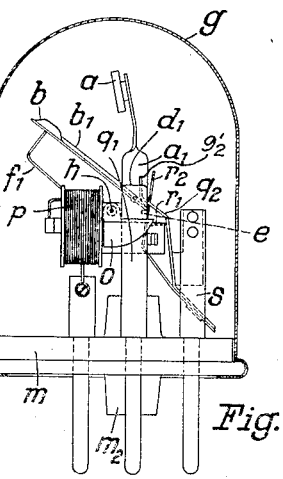
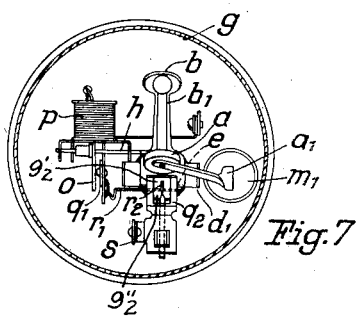
Inventor:

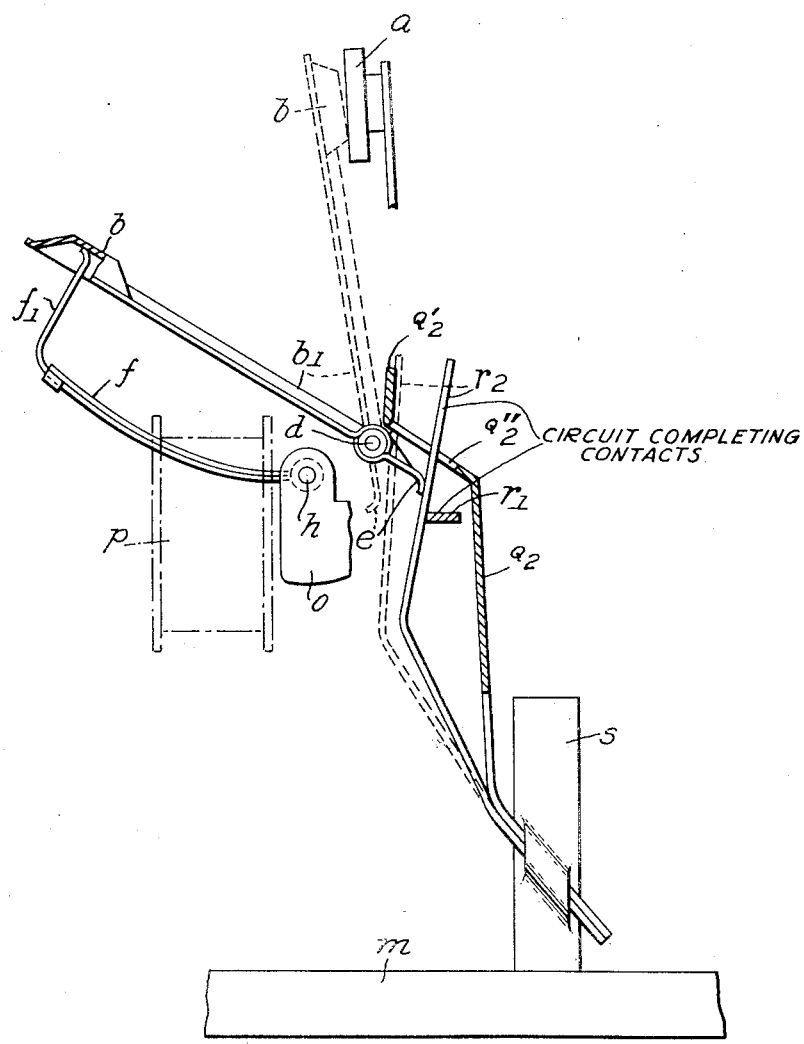

Patented Oct. 10, 1939

2,175,354

UNITED STATES PATENT OFFICE 2,175,354

ELECTROSTATIC RELAY

Egon Lewin, Berlin, Germany

Application October 5, 1937, Serial No. 167,391
In Germany February 18, 1933

11 Claims. (Cl. 200—87)

This invention relates to an electrostatic relay, for use generally in supervisory systems.

It is an object of this invention to render possible the reliable operation of the system with very low voltages, for instance of a few volts.

Another object of the invention is to provide for a system which can be accurately set or adjusted in a simple manner so as to operate at an accurately predetermined potential.

Still another object is to provide for an apparatus which is adapted for signalling purposes, for instance in room supervision or safety plants.

According to this invention the system for electrostatic relay or measuring apparatus comprises a stationary and a movable condenser plate which are insulated from each other. A particular feature of the system consists in that at least one of the two condenser plates, for instance the movable plate has a projection in the form of a calotte, or in the form of a point or cone or the like.

The invention will be better understood by reference to the following detailed description in connection with the accompanying drawings, showing by way of example and diagrammatically some embodiments of the invention, viz—

Figure 1 is a schematical side view of a system of condenser electrodes, with the cover of the casing removed for inspection.

Figure 1a is a front elevation of the contact surface of a condenser electrode.

Figure 2 is a front elevation of a movable condenser electrode.

Figure 3 is a side elevation of an arrangement for causing the movable electrode of a relay to engage the stationary electrode.

Figure 4 is a side elevation of a suspension system for a relay according to this invention, with the casing of the relay system shown as made of a transparent material like glass.

Fig. 5 is a front elevation of a practical form of a relay, with the glass enclosure in section.

Figure 6 is a side elevation of the relay shown in Figure 5, with the glass enclosure in section.

Figure 7 is a plan view of the relay shown in Figures 5 and 6, with the glass enclosure in section.

Figure 8 is a fragmentary side view, partly in section taken on the line 8—8 of Fig. 5, on an enlarged scale, of the lever and contact spring arrangement in the relay according to Figures 5 to 7.

Figs. 9, 10, 11, 12 are side elevations of various modifications of condenser electrodes having the invention applied thereto.

Referring now to the drawings and first to Figure 1, a system is shown which comprises a stationary condenser plate $a$ and a movable plate $b$ which is pivotally mounted at $d$ by an arm $b_1$. The two condenser plates are provided to be charged or energized with different potentials as indicated by the two leads marked "+" and "—". By means of a special device which will be hereinafter described the movable plate $b$, $b_1$ can be made to engage the plate $a$ after it has disengaged this electrode and it is then held in this position of engagement provided that a predetermined potential prevails between $a$ and $b$.

When the potential decreases below a predetermined critical working point, the plate $b$ disengages plate $a$ and swings in a clockwise direction under the action of a force such as a spring or weight acting in the direction of the arrow. This swinging or tipping movement of plate $b$ may be utilized for actuating any desired device, for instance a set of contact springs, for signalling purposes or the like. The force which counteracts the electrostatic force may be adjustable.

In order to prevent sticking of the movable plate to the stationary plate due to atmospheric pressure, the whole system may be air-tightly enclosed, for instance in a glass cylinder or glass bulb $g$ that may be more or less evacuated.

The available power of attraction between the plates $a$ and $b$ depends on the potential between the plates, the plate distance and the size of the two plates.

I have found that a very reliable and uniform working of the apparatus is ensured if the following arrangement is used:

One or both of the two condenser plates $a$ and $b$ is or are slightly curved, for instance in the manner shown for the plate $b$ in Figure 1, at least at those points where the attraction of the plates becomes effective. This curvature or convex shape is advantageously in the form of a small calotte or portion of a comparatively large ball or sphere. Similar shapes are shown by way of example in Figures 3, 4 and 5 to 8. In this manner it is effected that there is always a uniform section or portion of the spherical area $b$ available for engagement with the plate $a$, so that uniform distances and uniform electrostatic conditions are ensured, even if the condenser plates $a$ and $b$ are more or less out of their accurate alignment, for instance due to inaccuracies in the pivot $d$ of the plate $b$.

Practical experiments have shown that the accuracy and speed of response or action of the relay may be increased by providing at least one, but preferably both of the condenser plates, with a rough effective contact surface, as indicated in Figures 1, 3 and 4. This rough surface is advantageously provided, in case of one rough surface only, on the plate bearing an insulating surface coating.

Moreover, I have found that the functioning of the system can be improved by forming the insulating coating at least on one of the two electrode plates, for instance the coating on the rough surface, with fine pores or capillary cracks or scratches, such as indicated in Figure 1a. Such pores or cracks can be produced for instance by heating and then rapidly cooling an electrode provided with an insulating skin of glass, porcelain or the like.

The insulating skin at least on one of the two electrodes, for instance on the movable plate $b$ consisting of aluminium sheet material, may be formed of the electrode material proper, by suitable treatment such as oxidation.

It makes no fundamental difference whether the stationary condenser plate $a$ or the movable condenser plate $b$ is formed with a spherically convex shape.

Figure 2 shows a very advantageous and light construction of the condenser plate $b$, $b_1$ for instance of thin sheet aluminium with a profile rib $c$ by which the portion $b_1$ is stiffened. The lower end of the electrode $b$ is stamped to form a lug or eyelet for receiving the shaft $d$. Thus it is possible to make the condenser plate sufficiently stiff and to attach it rigidly to the shaft $d$ without increasing its weight by soldering, riveting or welding. It is advantageous to actuate the contacts not by the shaft but by the condenser plate $b$, $b_1$ proper. To this end, a set of springs which will be hereinafter described in detail may be arranged as close as possible to the shaft $d$, which set of springs is actuated, for instance by means of a projection $e$, when the electrode $b$ disengages electrode $a$. In this case no torsional stress is produced between the electrode $b$, $b_1$ and its shaft $d$.

Moreover, I contemplate, within the scope of this invention, to provide means by which the movable condenser plate $b$, $b_1$ is returned very softly and uniformly to the stationary electrode $a$. To this end, a return lever $f$ may be swingably mounted as at $h$ in Figure 3, which lever is under spring or weight or electromagnetic action and formed very resilient at least at its end $f_1$ which contacts the movable electrode $b$, $b_1$.

In view of the special shape of the coacting electrode surfaces, very small electric potentials are sufficient to hold the electrodes mutually attracted. On the other hand, due to this high sensitivity, my system is also very sensitive against mechanical shocks or vibrations. Therefore I contemplate suspending the whole system in its housing $g$, or else suspending the housing $g$ with the system in it resiliently, for instance, by means of a spring $i$ and wires or small rods $k$, as shown in Fig. 4. In order to regulate the inclination of the relay and thus its working point, that is, the critical potential below which the movable electrode falls off, the rod $k$ opposite the system is divided and the two ends thus formed are threaded in a sleeve $k_1$ with oppositely directed threads so that by rotation of the sleeve $k_1$, the distance between the outer ends of the rods $k$ may be adjusted.

In the practical embodiment of the invention shown in Figures 5 to 8 the rod $a_1$ which serves for supporting and energizing the stationary electrode $a$ and the U-shaped bracket $d_1$ for the shaft $d$ of the movable electrode $b$, $b_1$ are mounted on an insulating plate $m$ by means of socket members $m_1$, $m_2$.

The return lever $f$ with its resilient contact point $f_1$ is attached to the armature projection $o$ of the electromagnetic coil $p$ and thus is swingable at $h$, so that the coil $p$ when energized causes the lever $f$, $f_1$ to swing upwardly.

In Figures 5 to 8 a set of contact springs $r_1$, $r_2$ as hereinbefore mentioned is shown, which springs are acted upon by the projection $e$ of the movable electrode $b$, $b_1$ and may serve for instance for opening and closing a signal circuit.

The contact spring $r_1$ consists of a thin wire and is mounted on a metal rod $q_1$ which at the same time forms the current lead or terminal and carries the electromagnet $p$. The contact spring $r_2$ is mounted in a suitable manner on a metal piece $q_2$ and is acted upon directly from the movable condenser plate $b$, $b_1$, $e$ (Figure 8). The metal piece $q_2$ in turn is rigidly and electrically connected with a current feeding rod $s$ and by means of its upper end portion $q_2'$ through a perforation $q_2''$ of which the contact spring $r_2$ extends, serves to define the initial open position of said contact spring.

The operation of the apparatus shown in Figs. 5 to 8 will now be described with special reference to Fig. 8.

Assuming the movable electrode $b$ is at first in the attracted position shown in dotted lines in Fig. 8, and held in this position under action of an electrostatic potential existing between the electrodes $a$ and $b$, which are insulated from each other, it will be seen that in this position the contact spring $r_2$ mounted at $s$ is not in engagement with the contact spring $r_1$ so that any circuit in which the contact springs $r_1$, $r_2$ are inserted will be open. If the circuit, for example, serves to energize a signal bell, the bell will not be operated as long as the electrode $b$ is in its attracted position with respect to electrode $a$. On the other hand, as soon as the potential between $a$ and $b$ decreases below a predetermined minimum amount, the electrostatic attraction will be insufficient to counteract the gravity tending to swing the elecrode $b$ in counter-clockwise direction and so, the electrode $b$ will fall back into the position shown in full lines in Fig. 8. At the same time the projection $e$ at the opposite arm of the member $b_1$, $b$ will cause the contact spring $r_2$ to engage the contact spring $r_1$. Thus, the bell circuit, for instance, will be closed and an alarm signal will be produced. In order to switch off the bell or, in other words, to open the circuit, the solenoid coil $p$ may be energized for a moment from a remote point, for example, by a push button, whereby the magnetic core member $o$ is attracted electromagnetically into the coil and the electrode $b$, $b_1$ swung in a clockwise direction. At the same time the contact spring $r_2$ is allowed to return to its initial position shown in dotted lines in Fig. 8 and thus the circuit is opened. Provided the original electrostatic potential has been restored in the meantime, for instance by removing the cause of the decrease of the normal potential, the electrode $b$ will be held in its position engaging electrode $a$ after the current through the coil $p$ which as mentioned acts for a short period only has been switched off and the apparatus is now ready for further operations of the kind described.

It will be readily understood that a relay system of the type shown in Figs. 5 to 8 may be very useful in safety plants of any kind, for example to protect any object against burglars, as it has no current consumption at all in its operative condition, that is, when it is ready for service.

Various modifications of convex electrodes are shown in Figs. 9, 10, 11 and 12. In Fig. 9, the movable plate $b$ is provided with a small calotte $b_2$. In Fig. 10, a projection $b_3$ is provided on the convex plate $b$, while in Fig. 11, the plate $b$ on which the projection $b_4$ is provided, is made plane. A further modified configuration of the electrode $b$ is shown at $b_5$ in Fig. 12, but it will be understood that for most practical purposes, the electrode shape shown in Fig. 1 is the preferred form.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

Having now described my invention what I claim is:

1. In a relay system, in combination, a stationary condenser electrode, a swingable condenser electrode adapted to be held in engagement with said stationary electrode under action of a controlling potential and mechanical means adapted to cause said swingable electrode to disengage said stationary electrode when the controlling potential becomes less than a predetermined minimum value, an insulating coating at least on one of said electrode surfaces and a convex elevation at least on one of the electrode contact surfaces.

2. In a relay system, in combination, a stationary condenser electrode, a swingable condenser electrode adapted to be held in engagement with said stationary electrode under action of a controlling potential and mechanical means adapted to cause said swingable electrode to disengage said stationary electrode when the controlling potential becomes less than a predetermined minimum value, an insulating coating at least on one of said electrode surfaces, a convex elevation at least on one of the electrode contact surfaces and at least one contact spring adapted to be operated by the swingable electrode disengaging the stationary electrode.

3. A relay system, comprising in combination a substantially stiff stationary condenser electrode, a substantially stiff movable condenser electrode adapted to stick to said stationary electrode under action of a predetermined minimum electrostatic potential and to be withdrawn from said stationary electrode under action of a mechanical counterforce when said potential is less than said minimum, and insulating means between said electrodes, at least one of said electrodes having a convex active electrode surface.

4. A relay system, comprising in combination a stationary condenser electrode, a pivotally mounted condenser electrode of thin and light sheet metal formed with a convex active electrode surface and with a pivot arm having at least one rib to increase its stiffness, and insulating means between said electrodes.

5. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode, insulating means between said electrodes, and means adapted to return said swingable electrode to said stationary electrode at a predetermined time after it has been swung away.

6. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode, insulating means between said electrodes, means adapted to return said swingable electrode to said stationary electrode at a predetermined time after it has been swung away, and a remote control for said return means.

7. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode, insulating means between said electrodes, and a resilient holder for said electrode system adapted to protect said system against mechanical influences tending to disturb the condition of electrostatic attraction.

8. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode, insulating means between said electrodes, and a casing adapted to enclose said system airtightly.

9. A relay system, comprising in combination a stationary condenser electrode, a swingable condenser electrode adapted to stick to said stationary electrode in energized condition, at least one of said electrodes having a convex active electrode surface and at least one of said electrodes having a rough active electrode surface, a source of mechanical force tending to swing the swingable electrode away from the stationary electrode, and insulating means between said electrodes.

10. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode and at least one of said electrodes having an insulating coating provided with many minute recesses.

11. A relay system, comprising in combination a stationary condenser electrode, a swingable condenser electrode adapted to stick to said stationary electrode in energized condition, at least one of said electrodes having a convex active electrode surface, a source of mechanical force tending to swing the swingable electrode away from the stationary electrode, insulating means between said electrodes, and a lever adapted to return said swingable electrode to said stationary electrode at a predetermined time after it has been swung away and formed resilient at its end which engages said swingable electrode.

EGON LEWIN.